(12) United States Patent
Yedidia et al.

(10) Patent No.: US 7,372,393 B2
(45) Date of Patent: May 13, 2008

(54) METHOD AND SYSTEM FOR DETERMINING UNWRAPPED PHASES FROM NOISY TWO-DIMENSIONAL WRAPPED-PHASE IMAGES

(75) Inventors: Jonathan Yedidia, Cambridge, MA (US); Ali Azarbayejani, Boston, MA (US); Emin Martinian, Waltham, MA (US); Ying-Zong Huang, Seattle, WA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 124 days.

(21) Appl. No.: 11/482,491

(22) Filed: Jul. 7, 2006

(65) Prior Publication Data

US 2008/0007450 A1    Jan. 10, 2008

(51) Int. Cl.
*G01S 13/90* (2006.01)
(52) U.S. Cl. .............. 342/25 R; 342/25 A; 342/25 C; 342/25 F; 342/195
(58) Field of Classification Search .............. 342/25 R, 342/25 A, 25 B, 25 C, 25 D, 25 E, 25 F, 342/179, 195–197
See application file for complete search history.

(56) References Cited

U.S. PATENT DOCUMENTS

| | | | | |
|---|---|---|---|---|
| 5,432,447 A | * | 7/1995 | Song ........................ | 324/309 |
| 5,783,942 A | * | 7/1998 | Bernstein et al. ........... | 324/306 |
| 6,011,625 A | * | 1/2000 | Glass ........................ | 356/496 |
| 6,150,973 A | * | 11/2000 | Pritt .......................... | 342/25 C |
| 6,445,182 B1 | * | 9/2002 | Dean et al. ................. | 324/309 |
| 6,703,835 B2 | * | 3/2004 | Patch et al. ................ | 324/307 |
| 6,891,370 B2 | * | 5/2005 | Cline et al. ................ | 324/307 |
| 2007/0035302 A1 | * | 2/2007 | Ikedo et al. ................ | 324/320 |
| 2007/0110334 A1 | * | 5/2007 | Takahashi et al. .......... | 382/276 |

OTHER PUBLICATIONS

F.R. Kschischang, B.J. Frey, and H.-A. Loeliger, "Factor Graphs and the Sum-Product Procedure," IEEE Transactions on Information Theory, vol. 47, pp. 498-519, Feb. 2001.

J.M.N. Leitao, see J.M.B. Dias and J.M.N. Leitao, "The Z M Procedure: A Method for Interferometric Image Reconstruction in SAR/SAS," IEEE Transactions on Image Processing, vol. 11, pp. 408-422, Apr. 2002.

(Continued)

*Primary Examiner*—John B Sotomayor
(74) *Attorney, Agent, or Firm*—Dirk Brinkman; Clifton D. Mueller; Gene V. Vinokur

(57) ABSTRACT

A method converts an input image of noisy wrapped phases to an output image of absolute unwrapped phases. The noisy wrapped phases in the input image are represented as a set of re-wrapped phases and a set of phase shifts. The set of re-wrapped phases are partitioned into a first group and a second group. Integer differences between the phase shifts are optimized while holding the re-wrapped phases fixed. Then, the first group of re-wrapped phases are optimized, while holding the integer differences between the phase shifts, and the second group of re-wrapped phases fixed. The integer differences between the phase shifts are optimized again, while holding the re-wrapped phases fixed. Then, the second group of re-wrapped phases are optimized, while holding the integer differences between the phase shifts, and the first group of re-wrapped phases fixed. The optimizing steps are repeated until the re-wrapped phase converge. Then, the converged re-wrapped phases and integer differences between the phase shifts are output as an output image of absolute unwrapped phases.

15 Claims, 9 Drawing Sheets

OTHER PUBLICATIONS

Constantini, M., "A novel phase unwrapping method based on network programming," IEEE Transactions on Geoscience and Remote Sensing. 36, pp. 813-821, 1998.

Frey et al. "Very loopy belief propagation for unwrapping phase images," 2001.

* cited by examiner

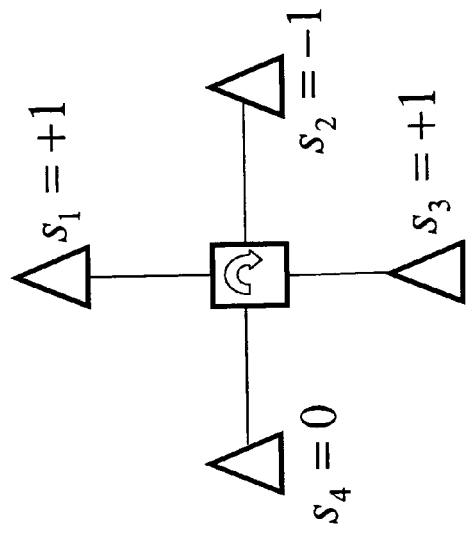
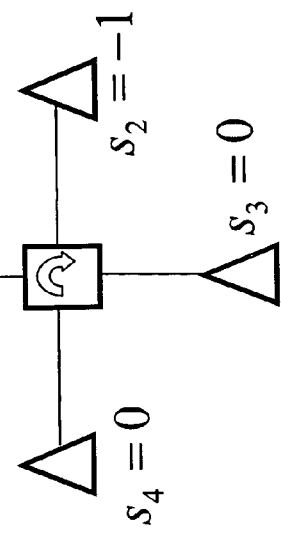
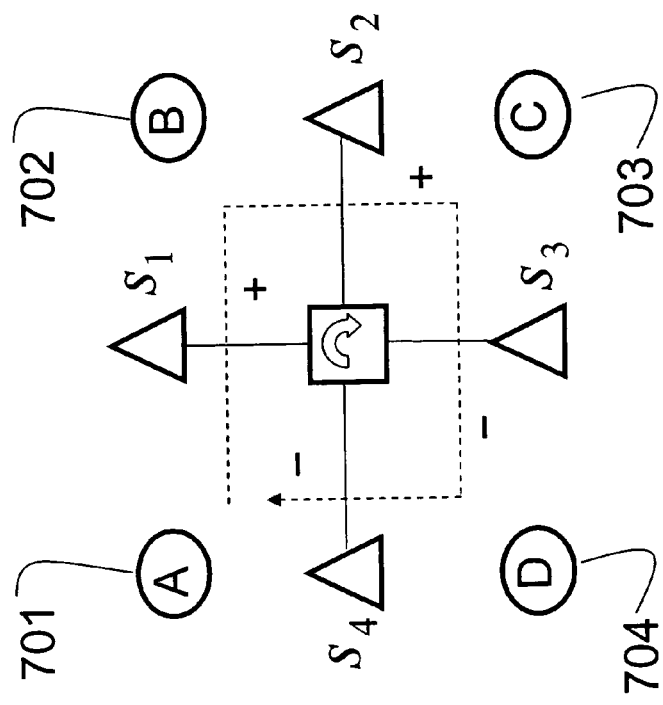
*Fig. 7A*
*Fig. 7B*
*Fig. 7C*

METHOD AND SYSTEM FOR DETERMINING UNWRAPPED PHASES FROM NOISY TWO-DIMENSIONAL WRAPPED-PHASE IMAGES

FIELD OF THE INVENTION

The present invention relates generally to image processing, and particularly to interpreting noisy two-dimensional phase-wrapped images, such as those that arise in synthetic aperture radar (SAR) interferometry, optical interferometry, adaptive optics, and magnetic resonance imaging.

BACKGROUND OF THE INVENTION

The Two-Dimensional Phase-Unwrapping Problem

Two-dimensional phase-unwrapping is an important data-processing step in several important applications, including interferometric synthetic aperture radar (SAR), magnetic resonance imaging, optical interferometry, and adaptive optics. For an introduction, see D. C. Ghiglia and M. D. Pritt, "Two-Dimensional Phase Unwrapping: Theory, Procedures, and Software," John Wiley & Sons, 1998.

The phase-unwrapping problem arises when a set of "phases," which are continuous-valued variables, which can take on any real value, are only known modulo $2\pi$ radians, and it is desired to know the true absolute values of the phases. In the two-dimensional version of the phase-unwrapping problem, the phases are arranged in a two-dimensional, rectangular lattice. The rectangular lattice of all the phases is referred to herein as an "image" and one particular lattice point in the image will be referred to as a "pixel."

In many applications, the phases serve as a proxy for some other physical quantity, such as time delay, and can be used to infer some desired information. For example, in the interferometric SAR application, the phases indicate a relative time difference for two radar signals to return from a target. Knowing the geometry of the radar system, one can use the phases to infer a terrain elevation map. However, because the phases are only measured modulo $2\pi$ radians, the phases have to be "unwrapped" to recover a sensible terrain elevation map.

Phases are often measured in units of radians, but it is also possible, and sometimes more convenient, to measure them in units of cycles. For example, if a particular phase has a value of 4.5 cycles, it could equivalently be said to have a value of $4.5(2\pi)$ radians. The convention of measuring phases in units of cycles is used herein. Therefore, an unwrapped phase has a value that can be any real number of cycles, while a wrapped phase always has a value in the interval [0.0, 1.0). Note that this standard mathematical notation means that 0.0 and any number greater than 0.0 but less than 1.0 is a possible value, but 1.0 is not.

FIG. 1 shows an example of three images 101-103 of 12 pixels arranged in a 3×4 rectangle. In FIG. 1, the circles represent pixels, and the numbers the pixel values. Of course, images of practical interest are much larger. The image 101 contains the absolute phases. In the image 102, all the phases are "wrapped" by adding or subtracting an integral number of cycles so that the phases are within the interval [0.0, 1.0).

Noise

In practical systems where the phase-unwrapping problem arises, one must also deal with the fact that the measurements of the phases are nearly always corrupted by noise. In the image 103, some of the wrapped phase measurements are corrupted by noise. This is indicated by darkened circles.

Criteria for a Good Phase-Unwrapping Method

A good phase-unwrapping system should both remove noise and unwrap the phases to recover an image that is as close as possible to the image of the true absolute phases. The goal is to take as input a noisy phase-wrapped image, such as image 201, and return as output an unwrapped image 202. A sensible criterion for selecting among the possible output solution images is to select that image which is most probable. Of course, to determine the probability of any solution image, one needs a model that assigns probabilities to the unwrapped phase image 202, given the noisy wrapped phase image 201.

In many applications, the images are extremely large. It is not very unusual for the noisy and wrapped phase image to contain more than 100,000,000 pixels. To be practical for such problems, a phase-unwrapping method must therefore be very fast, and the time to produce the absolute phase image should scale linearly or nearly linearly with the number of pixels.

To summarize then, a good phase-unwrapping method should use a well-justified probabilistic model of phase images, and it should efficiently find the most probable or nearly most probable absolute phase image according to that probabilistic model.

Factor graphs

Probabilistic models can be represented using a bi-partite graph that is called a "factor graph," see F. R. Kschischang, B. J. Frey, and H.-A. Loeliger, "*Factor Graphs and the Sum-Product Procedure*," IEEE Transactions on Information Theory, vol. 47, pp. 498-519, February 2001. A factor graph contains two types of nodes, called "variable nodes" and "factor nodes." Variable nodes are only connected to factor nodes and vice-versa.

The variable nodes represent the variables of interest in a system, while the factor nodes represent local functions of the variables. When a variable node is connected to a factor node, it means that the corresponding variable is an argument of the corresponding local function.

A probabilistic model is represented by a factor graph according to the equation $$p(x_1, x_2, x_3, \ldots, x_N) = \frac{1}{Z} \prod_{a=1}^{M} f_a(\{x\}_a). \tag{1}$$

In equation (1), it is assumed that there are N variables that are denoted by $x_1, x_2, \ldots x_N$, and M local functions that are denoted by $f_1, f_2, \ldots, f_M$. The variables that are the arguments of the function $f_a$ are denoted by $\{x\}_a$. A normalization constant Z ensures that the sum of the probabilities of all possible configurations is one.

An alternative but equivalent way to interpret a factor graph is in terms of "costs," sometimes also called "energies," rather than local functions. In this interpretation, the overall probability is given by $$p(x_1, x_2, x_3, \ldots, x_N) = \frac{1}{Z} \exp\left(-\sum_{a=1}^{M} c_a(\{x\}_a)\right), \tag{2}$$

where $c_a(\{x\}_a)$ is the cost for the variables $\{x\}_a$ to be in a given configuration, which is related to the local function $f_a(\{x\}_a)$ by an equation $$c_a(\{x\}_a) = -\ln f_a(\{x\}_a).$$

It is often more convenient and intuitive to describe factor graphs in terms of the "cost" formulation, because then all individual costs can be summed to obtain the total cost. A most probable configuration of the variables is the configuration with lowest total cost.

Prior Art Phase-Unwrapping Methods

A large number of prior-art methods for unwrapping noisy two-dimensional phase-wrapped images are known. However, few of the prior-art methods use a well-justified and explicit probabilistic model. Even fewer methods are capable of both unwrapping and de-noising phase images. The methods described herein are those that are relevant to the present invention.

The most similar prior-art method is the "Z$\pi$M" method described by J. M. B. Dias and J. M. N. Leitao, see J. M. B. Dias and J. M. N. Leitao, "The Z$\pi$M Procedure: A Method for Interferometric Image Reconstruction in SAR/SAS," IEEE Transactions on Image Processing, vol. 11, pp. 408-422, April 2002. The Z$\pi$M method uses an iterative approach. In each iteration, the method uses a discrete optimization step followed by a continuous optimization step.

The probabilistic model used in the Z$\pi$M method uses a cost function that is quadratic in the difference between the absolute phases of two neighboring pixels. The cost function used in the Z$\pi$M method also depends sinusoidally on a difference between the input phase and the re-wrapped value of the obtained absolute phase.

Because of the form of the cost function used in the Z$\pi$M method, neither the discrete nor the continuous optimization steps are easy to perform. Therefore, Dias et al. describe complicated approximation techniques to perform the optimization steps.

A very important problem with the probabilistic model used in the Z$\pi$M method is that it does not explicitly constrain the phase derivatives to satisfy an "irrotational" constraint. This constraint is also known as the zero-curl constraint, see Dias et al. at p. 411. Dias et al. state that "this constraint is indirectly enforced by the prior [probability]: if the referred rotational is not zero at some point this implies the presence of large phase differences . . . which are penalized by the prior [probability]." However, this justification for dropping a very important constraint is not satisfying, because the phase difference cost is supposed to reflect a different aspect of the problem, i.e., the "smoothness" of the underlying phase image, rather than the inherent hard constraint represented by the zero-curl constraint.

Another prior-art method is called the "minimum cost flow" (MCF) method, see Constantini, M., "A novel phase unwrapping method based on network programming," IEEE Transactions on Geoscience and Remote Sensing. 36, pp. 813-821, 1998, incorporated herein by reference. The MCF method suffers from the very serious drawback that it cannot correct any noise in the phase images.

SUMMARY OF THE INVENTION

The embodiments of the present invention provide a method for converting an input image of noisy wrapped phases to an output image of absolute phases that is most probable given the noisy input image.

The method uses a factor graph as a statistical model. The factor graph includes variable nodes representing integer-shifts between neighboring pixels and re-wrapped phase values, as well as factor nodes representing a noise model, a smoothness model, and a zero-curl constraint.

The method iteratively optimizes the integer-shifts and the re-wrapped phase values, in sub-steps called respectively the "shift-optimization" (SO) and "phase-optimization" (PO) steps. In a single iteration of the method, the SO step is applied, and then the PO step is applied on a first group of re-wrapped phases. Then, the SO step is applied again, and the PO step is applied to on another group of the re-wrapped phases. When the iterations converge, so that the re-wrapped phase and integer-shift values stop changing, the method completes and outputs the absolute phase image.

BRIEF DESCRIPTION OF THE DRAWINGS

FIG. 7 is a schematic of zero-curl nodes connected to shift nodes according to an embodiment of the invention.

DETAILED DESCRIPTION OF THE PREFERRED EMBODIMENTS

Figure 1:
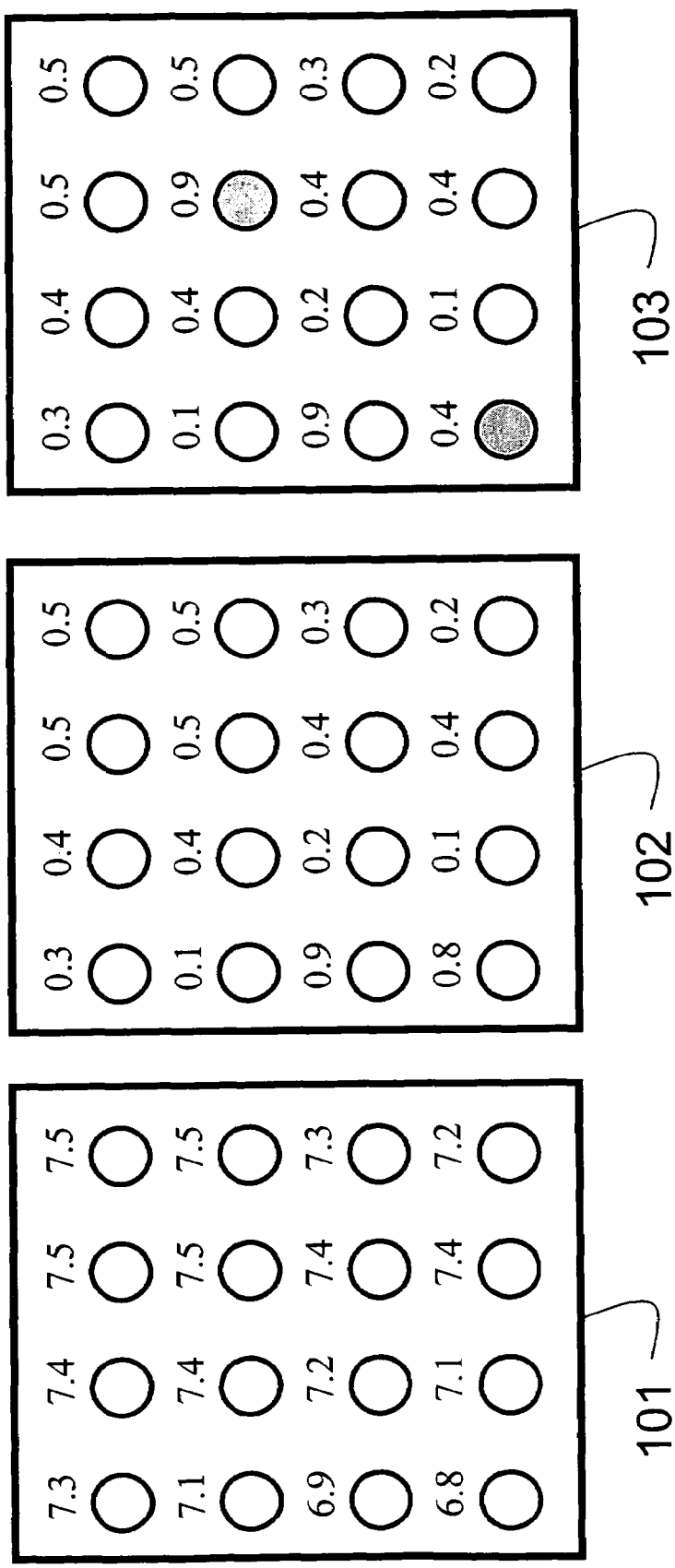
FIG. 1 is a block diagram of an absolute phase image, a wrapped phase image, and a noisy phase image.
Figure 2:
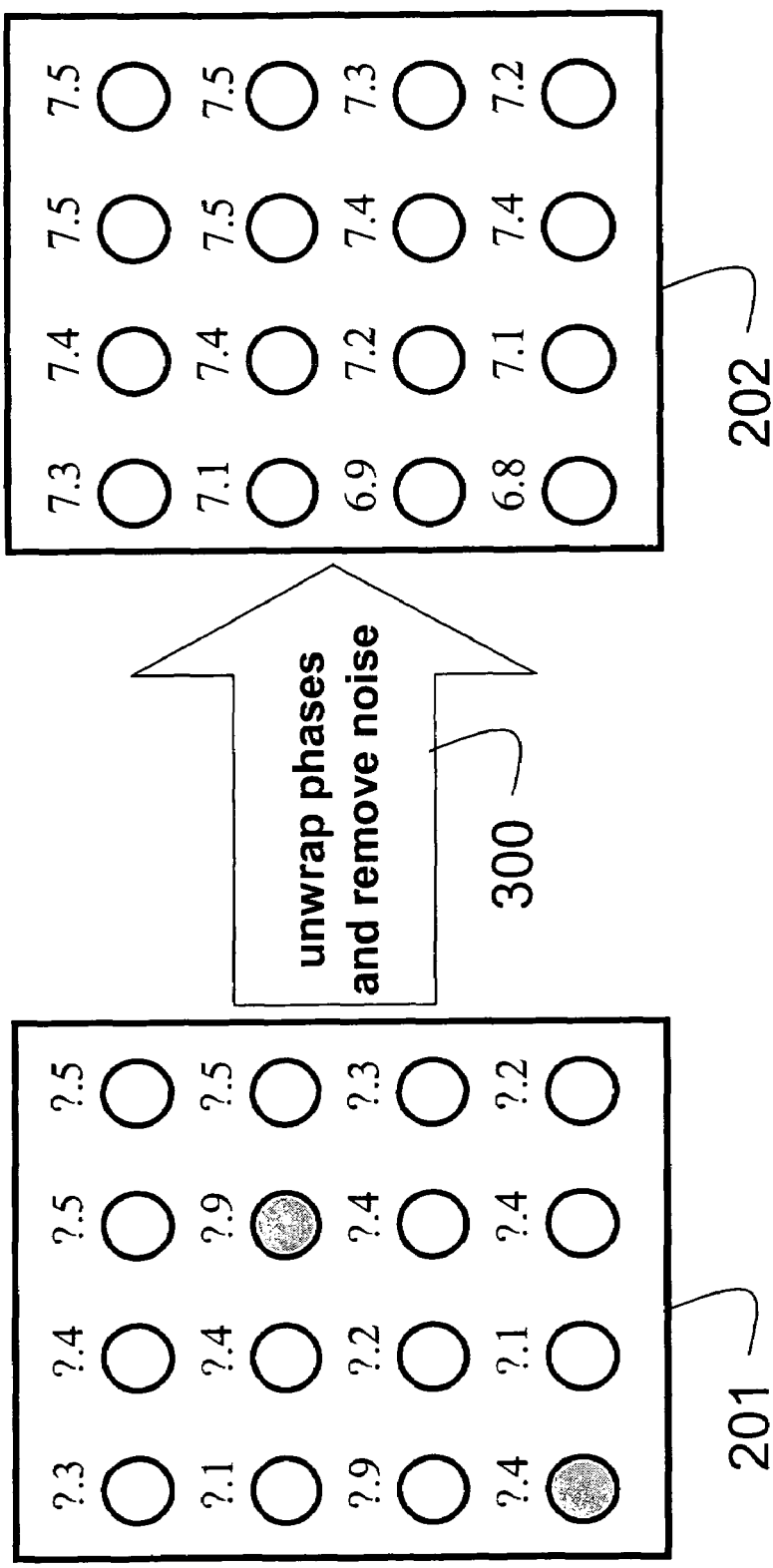
FIG. 2 is a flow diagram of a method for converting an image of noisy wrapped phases into an image of absolute phases according to an embodiment of the invention.

FIG. 2 shows a method 300 for converting an image of noisy wrapped phases (interferogram) 201 to an image of absolute phases (real phase map) 202 according to an embodiment of our invention. The symbol '?' indicates the integer portion of the wrapped phase that is to be determined.

Figure 3:
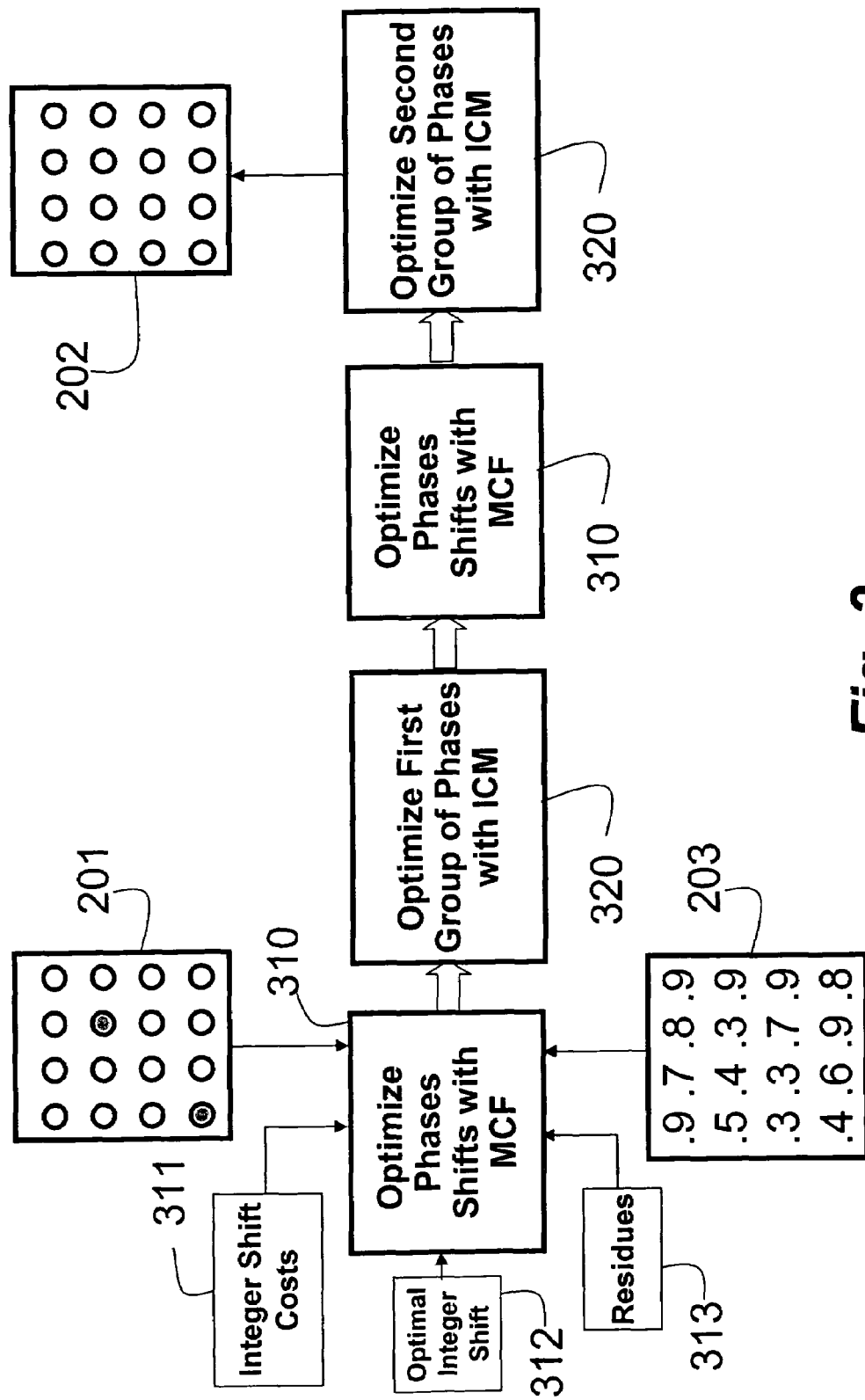
FIG. 3 is a flow diagram of detailed steps of the method of FIG. 2.

FIG. 3 shows the detailed steps of the method 300. First, we represent noisy wrapped phases in an input image as a set of re-wrapped phases and a set of integer phase shifts, as shown and described with respect to FIG. 5. The re-wrapped phases are partitioned into two groups so that adjacent re-wrapped phases are assigned to in different groups. This can be done by grouping the re-wrapped phases according to a checkerboard pattern as shown and described with respect to FIG. 9.

The method performs 310 phase shift optimization (SO) on the input image 201 using a minimum cost flow (MCF) procedure. Then, phase optimization (PO) 320 is applied on a first group of the re-wrapped phases using an iterated conditional modes (ICM) procedure. The shift optimization is applied 310 again, and then, the phase shift optimization is applied 320 to the second group of the re-wrapped phases.

Figure 5:
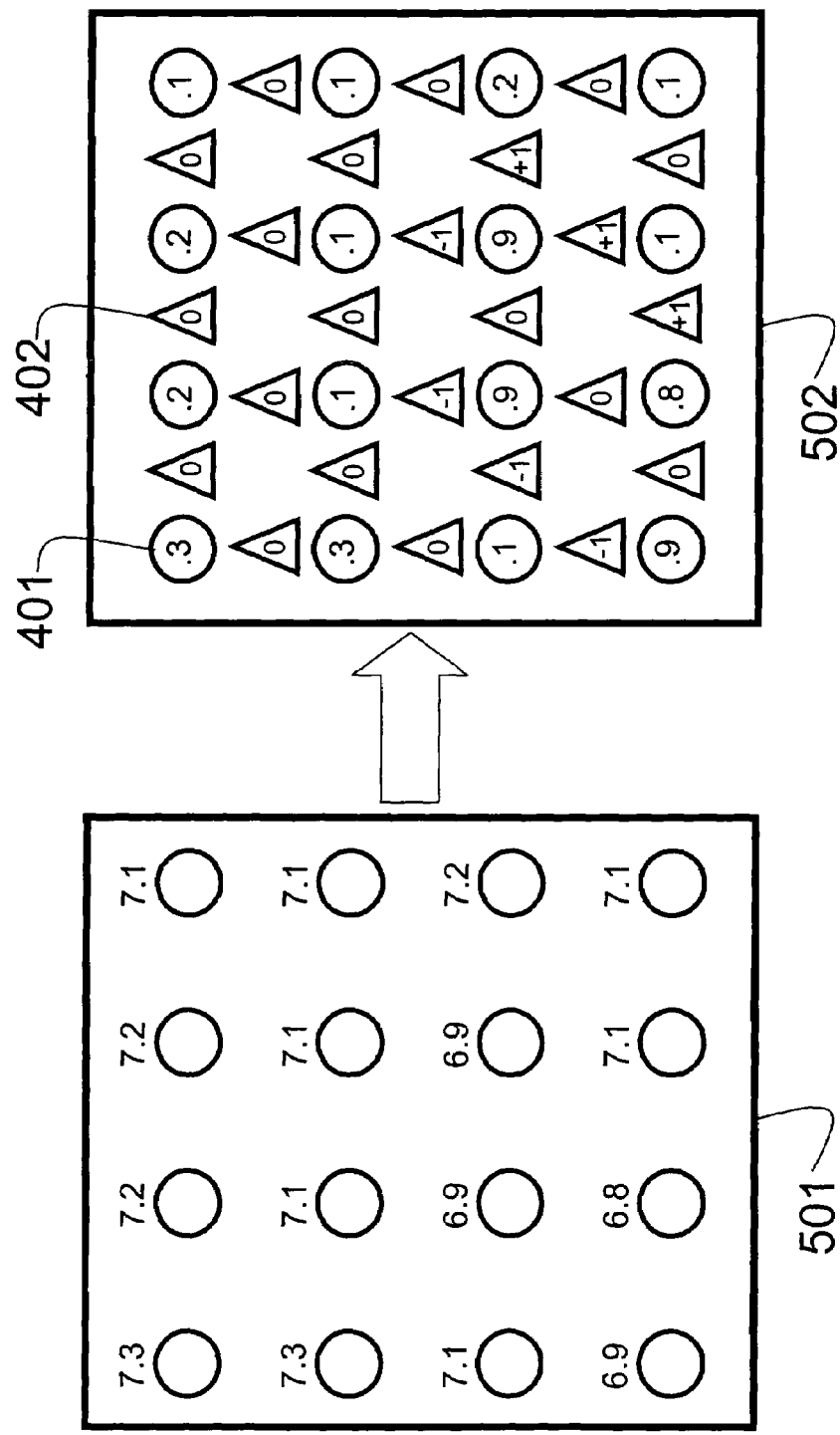
FIG. 5 is a representation of absolute unwrapped phases in an input image as a set of re-wrapped phases and a set of integer phase shifts.

In actual practice, as stated above, the wrapped image 201 is first represented as a set of re-wrapped phases and phase shifts in a preprocessing step, see FIG. 5.

The above steps are repeated until a termination condition is reached, e.g., the integer shifts and phases converge, and the output image 202 with absolute unwrapped phases is produced.

Details of the method are described below.

Inputs

The input to our method is a set of noisy wrapped phases arranged on a two-dimensional rectangular lattice of an interferogram. In an embodiment of the invention, the wrapped phases are represented in units of cycles, such that each noisy wrapped phase is a real number in the range [0.0, 1.0).

We measure the wrapped phases in units of cycles, i.e., one cycle corresponds to a phase range of 0 to $2\pi$ radians. In the examples below, we measure the phases to four significant digits. Thus, the phases have possible values, in units of cycles, of 0.0000, 0.0001, 0.0002, 0.0003, . . . , 0.9997, 0.9998, 0.9999.

As shown in FIG. 2, the input interferogram 201 includes pixels (circles) with associated wrapped phases with unknown integer portions. The output of our invention is the absolute unwrapped phase image 202.

Reliability Map

Optionally, the method 300 can take as a second input a provided reliability map 203. The reliability map is also a rectangular lattice of real numbers. The reliability map has the same dimensions as the lattice of wrapped phases 201. The reliability map indicates a probability that the corresponding noisy wrapped phase in the input image is reliable. A large value for a pixel in the reliability map indicates a high reliability for the corresponding wrapped phase value. Pixels with values in the reliability map less than a threshold have corresponding wrapped phase values that are considered unreliable. If a wrapped phase value is reliable, then the non-integral part of the unwrapped phase should have a value close to that of the wrapped phase.

Factor Graph

Figure 4:
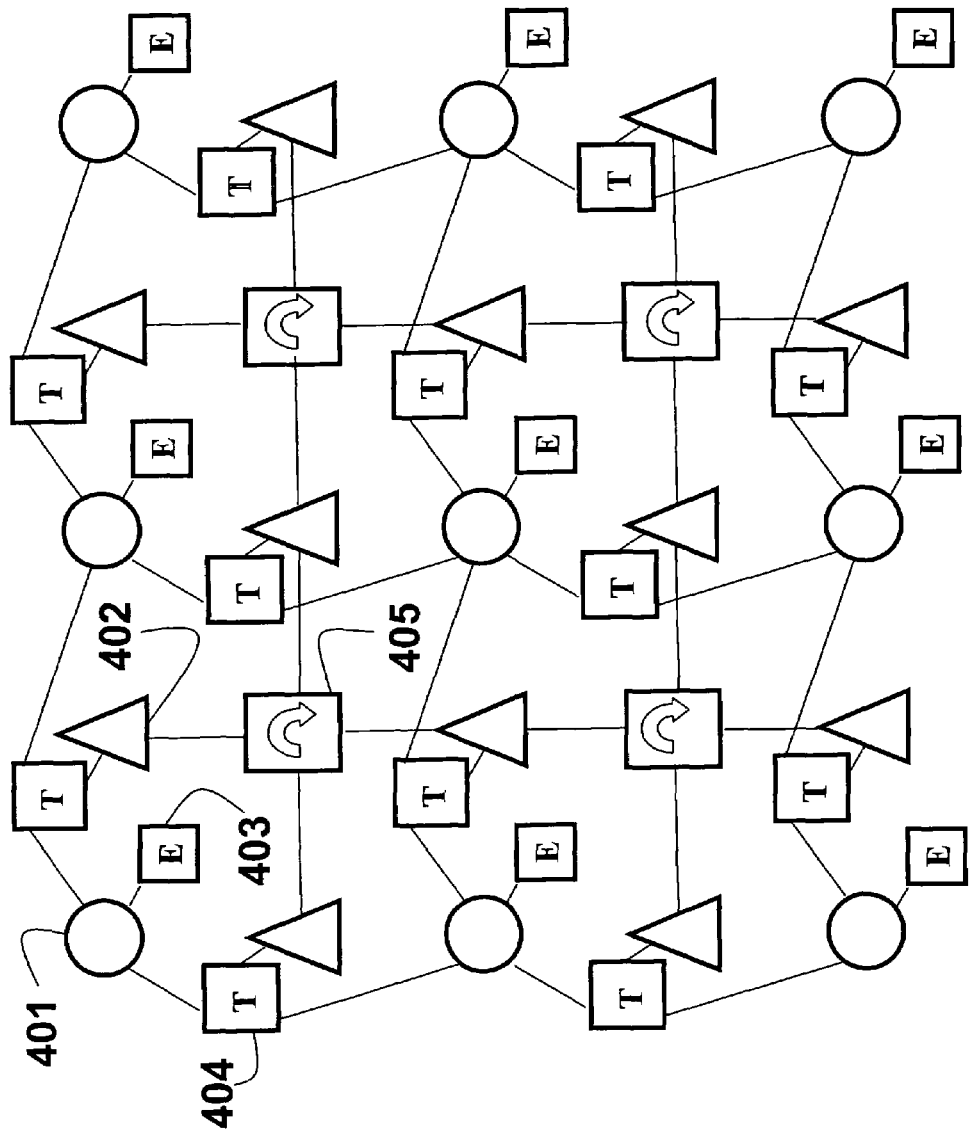
FIG. 4 is a factor graph according to an embodiment of the invention.

FIG. 4 shows a factor graph constructed according to an embodiment of the invention. The constructed factor graph includes variable nodes and factor nodes. Variable nodes are only connected to factor nodes and vice-versa.

Variable Nodes

According to an embodiment of the invention, the factor graph includes two types of variable nodes: variable phase nodes 401 and variable integer-shift nodes 402.

Phase Nodes

Each variable phase node 401 represents the non-integral part of the unwrapped phase. For example, if the unwrapped phase is 7.51 cycles, then the phase node has a value of 0.51 cycles. The phase nodes can take on any value in units of cycles in a range of [0.0, 1.0).

Integer-Shift Nodes

Each variable integer-shift node 402 represents an integer phase difference between neighboring unwrapped phase nodes. For example, if the unwrapped phase of one pixel is 5.97, and the unwrapped phase of the neighboring node to the right of the integer shift node is 6.03, then the integer-shift between the nodes is 1.

Integer-shift nodes can take on any integral value. However, for most practical phase unwrapping problems, the only likely values for the integer-shifts are −1, 0, or +1. For this reason, the integer-shift values according to an embodiment of the invention are selected from the set {−1, 0, +1}.

As shown in FIG. 5, an image 501 of unwrapped phases can be represented as a set 502 of re-wrapped phase nodes 401 and a set of integer shift nodes 402. The integer shifts nodes are positive if the pixel on the right or below a pixel of interest is the one that has a greater unwrapped phase.

An advantage of the "re-wrapped" representation is that it removes a global shift ambiguity. If the same integer is added to each unwrapped phase, then the values of the re-wrapped phases and the integer-shifts do not change. Therefore, in our method, we represent the absolute unwrapped phases as re-wrapped phases and integer shifts.

Factor Nodes

The variable nodes in the factor graph according to an embodiment of the invention are connected to three types of factor nodes, as shown in FIG. 4. The three different types of factor nodes are called "evidence" (E) nodes 403, "terrain" (T) nodes 404, and "zero-curl" nodes 405.

Each factor node assigns a "cost" to the variable nodes to which the factor node is connected. An overall cost of a configuration of all the variable nodes is a sum of the costs associated with each factor node in the factor graph, given that configuration. A lowest cost configuration corresponds to the highest probability configuration. Costs can be converted into a ratio of probabilities according to $$p_A/p_B = \exp(C_B - C_A) \qquad (3)$$

where $p_A$ and $p_B$ are the probabilities of the variable nodes being in configurations A and B, respectively, and $C_A$ and $C_B$ are the costs of the nodes being in configurations A and B, respectively.

Evidence Nodes

Each evidence node 403 is connected to a single phase variable node 401. The evidence node has two associated parameters: a preferred value of the phase, and a cost for disagreeing with the preferred value. The preferred value of the phase is the same as the input wrapped phase from the input interferogram. The evidence node always assigns a cost of zero if the phase agrees with the preferred value. If the phase disagrees with the preferred value, then the evidence node assigns a cost $C_{Evidence}$.

For each pixel, a magnitude of $C_{Evidence}$ does not depend on a precise value taken by the phase node. Whether the integer difference between the estimated phase value and the initial wrapped phase value is small or large, the cost of disagreeing with the wrapped phase value, $C_{Evidence}$, is always the same. The cost $C_{Evidence}$ remains fixed during operation of the method.

The cost $C_{Evidence}$ can be a function of the pixel. Using the reliability map, the cost, $C_{Evidence}$ can be based on a reliability of a wrapped phase value of a pixel. If the wrapped phase value for a particular pixel is considered reliable, then the cost $C_{Evidence}$ can have a large value to make disagreeing with the wrapped phase costly. If the wrapped phase value for a particular pixel is considered unreliable, then the cost $C_{Evidence}$ can have a small value.

Terrain Nodes

Each terrain node 404 is connected to two adjacent phase variable nodes 401 and one integer-shift variable node 402. The terrain nodes reflect that the unwrapped phases of two adjacent pixels are more likely to be close to each other than they are to be far from each other. For example, if a pixel has a wrapped phase value of 0.95 and an adjacent pixel to its right has a wrapped phase value of 0.05, then we would expect that there is most likely an integer-shift of +1 between the phases. That is, the real phases are more likely to be 6.95 and 7.05, rather than 6.95 and 6.05 (which would correspond to an integer shift of 0) or 6.96 and 5.05, which would correspond to an integer shift of −1.

In general, one can select any cost function that increases with the integer difference in the unwrapped phases between adjacent pixels. A linear cost function in a preferred embodiment of our invention corresponds to a Laplacian model in terms of probabilities. This model has the advantages that it corresponds well to the actual statistics of phase images for applications like interferometric synthetic aperture radar.

In a preferred embodiment of our invention, we assign a cost to each terrain node that is linear in a magnitude of a integer difference between the unwrapped phases of two adjacent pixels. For example, if the unwrapped phase of a pixel is 6.95, and the unwrapped phase of an adjacent pixel is 7.05, a smoothness cost for that pair of pixels should be 0.1.

Figure 6:
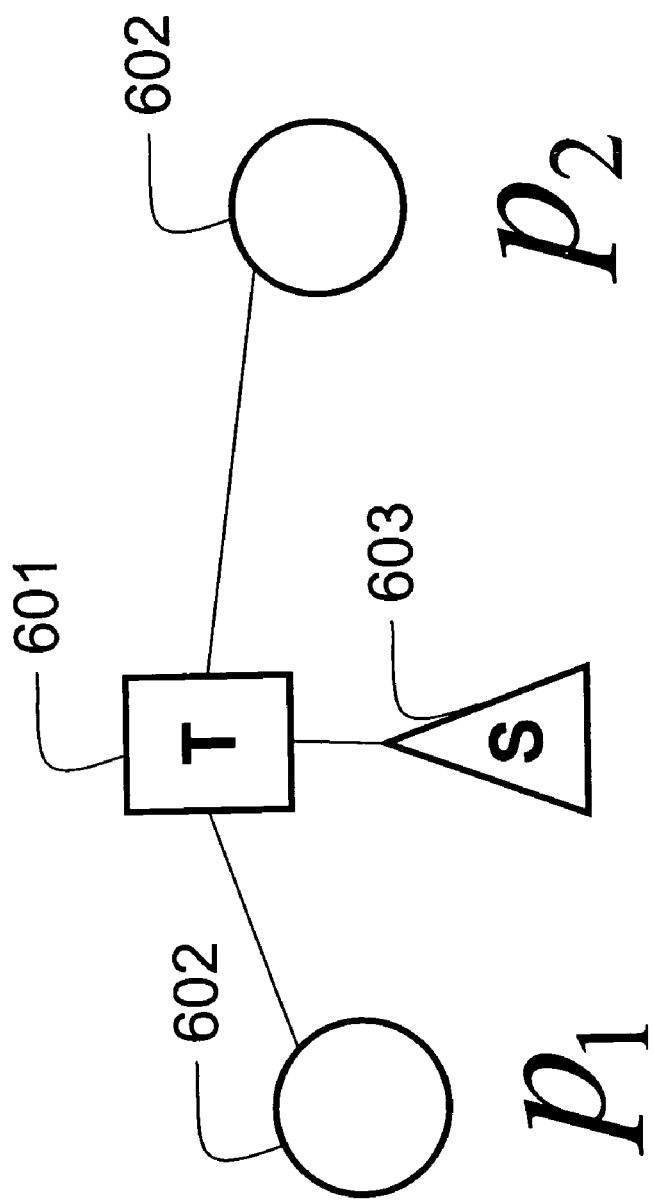
FIG. 6 is a schematic of a terrain factor node of the factor graph of FIG. 4 connected to two adjacent phase nodes.

As shown in FIG. 6, each terrain factor node is connected to two adjacent phase nodes 602 with rewrapped phases $p_1$ and $p_2$, and a shift node 603. A cost associated with each terrain node is linear in the magnitude of the integer difference between the real phases at those pixels, in terms of the re-wrapped phases and the integer shifts. The cost is given by the formula, $C_{Terrain} = |p_2 + s + p_1|$, where $p_1$ and $p_2$ are the re-wrapped phases of the two pixels, and s is the integer shift between the pixels.

Zero-Curl Nodes

Each zero-curl factor node 405 is connected to four adjacent variable integer-shift variable nodes 402. The zero-curl nodes enforce the constraint that as one travels around the loop of four pixels in an unwrapped phase image, returning ultimately to the same pixel, one must return to the same unwrapped phase. To enforce this constraint, the zero-curl node assigns a cost of infinity to any "illegal" configuration of integer-shifts that does not sum to zero as one travels around the loop. It assigns a cost of zero to all the "legal" configurations that do sum to zero. One also must properly take into account the conventions for which integer shifts are considered to be positive and which shifts are negative.

For example as shown in FIG. 7A, if traveling from pixel A 701 to pixel B 702 to pixel C 703 to pixel D 704 and back to pixel A 701, the four integer-shifts $s_1$ through $s_4$ between the pixels must satisfy the zero-curl condition $s_1 + s_2 - s_3 - s_4 = 0$. FIGS. 7B and 7C show examples of legal zero-cost configurations and illegal infinite-cost configurations, respectively.

The zero-curl constraint is a "hard" constraint. The constraint must be satisfied for any configuration of variable nodes that has a minimum overall cost. However, at intermediate stages, some zero-curl constraints may sometimes be unsatisfied. The ultimate goal is to ensure that all zero-curl constraints are indeed satisfied.

Minimum Cost Flow (MCF) Procedure

Our MCF procedure optimizes 310 integer differences between phase shifts of adjacent pixels, under the constraint that the values of the re-wrapped phases are fixed. The MCF procedure takes all current re-wrapped phases as input. Then, the integer shifts are optimized, while holding the re-wrapped phases fixed.

To implement our MCF procedure, we need to modify the structure of the input data. The modified data structures can be obtained from the set of fixed re-wrapped phases 502.

First, the MCF procedure 310 needs as input a set 311 of three costs for each integer shift node in the factor graph, a cost $C_{-1}$ for the shift having the value −1, a cost $C_0$ for the shift having the value 0, and a cost $C_{+1}$ for the shift having the value +1.

Figure 8:
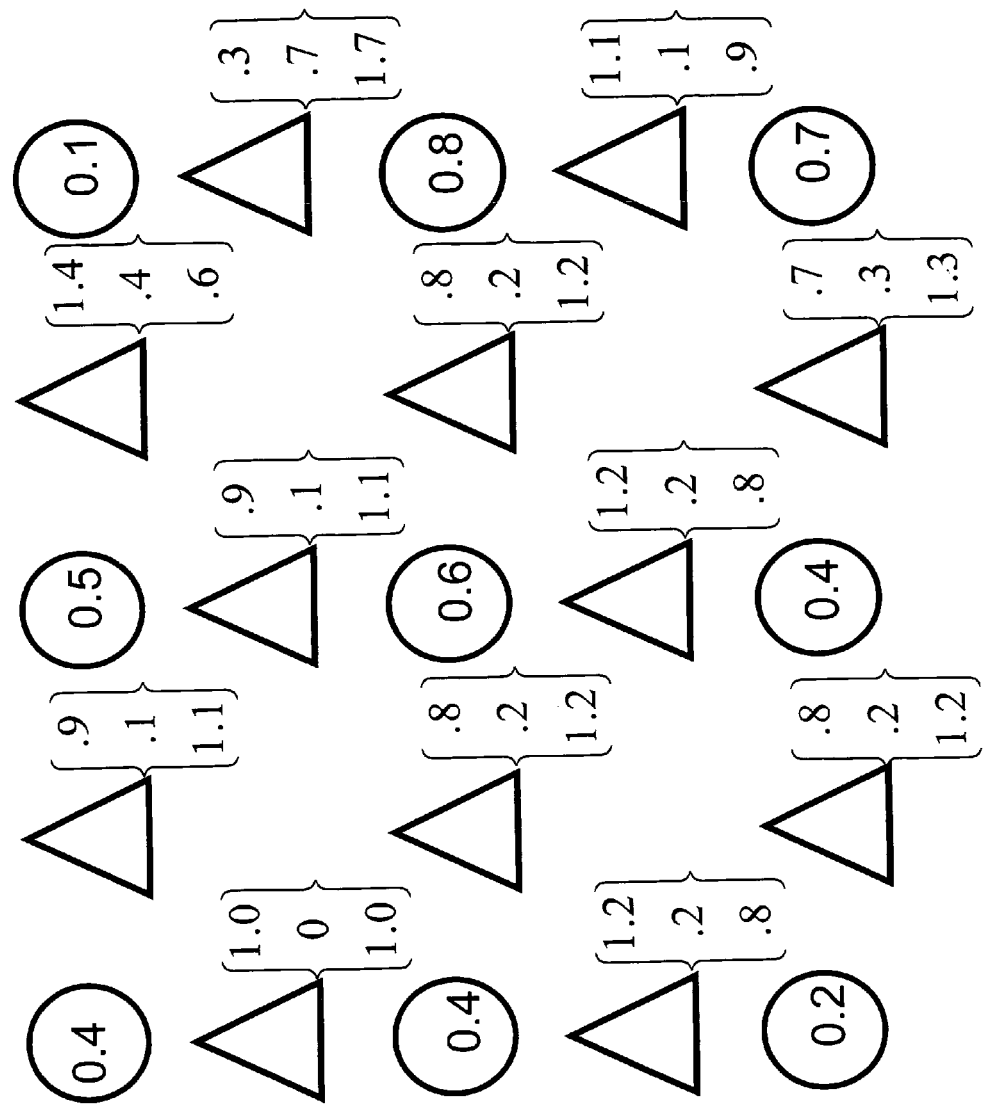
FIG. 8 is a schematic of costs associated with re-wrapped phases according to an embodiment of the invention.

We obtain the desired integer shift costs from the set of re-wrapped phases by determining the terrain costs that are given by each of the different possible integer shifts. For example, if a particular pixel had a wrapped phase value of 0.7, and the neighboring pixel on the right has a wrapped phase value of 0.9, then the costs for the integer shift between are:

$C_{-1} = |0.9 + (-1) - 0.7| = 0.8;$ $C_0 = |0.9 + 0 + 0.7| = 0.2;$ and $C_{+1} = |0.9 + (+1) - 0.7| = 1.2.$ FIG. 8 shows the three costs for an example set of re-wrapped phases.

Secondly, the MCF procedure needs a locally optimal integer shift 312, (whether the shift is −1, 0, or +1), for each shift node. For each shift node, we examine the integer shift costs and select the integer shift that has the lowest cost.

Third, the MCF procedure needs as input a set 313 of "residues," which are locations where the zero-curl constraint is not satisfied if the locally optimal integer shifts are used. The residues are obtained from the locally optimal integer shifts.

The MCF procedure outputs a set of integer shifts, such that a sum of the costs of all the integer shifts is minimized, and all the zero-curl constraints are satisfied. Note that the MCF procedure does not modify the rewrapped phases in any way. An important feature of our MCF procedure is that the procedure ensures that the zero-curl constraint is satisfied.

Iterated Conditional Modes (ICM) Procedure

The ICM procedure optimizes one group of the re-wrapped phases, while the other group of the re-wrapped phases and the integer shifts are held fixed.

Figure 9:
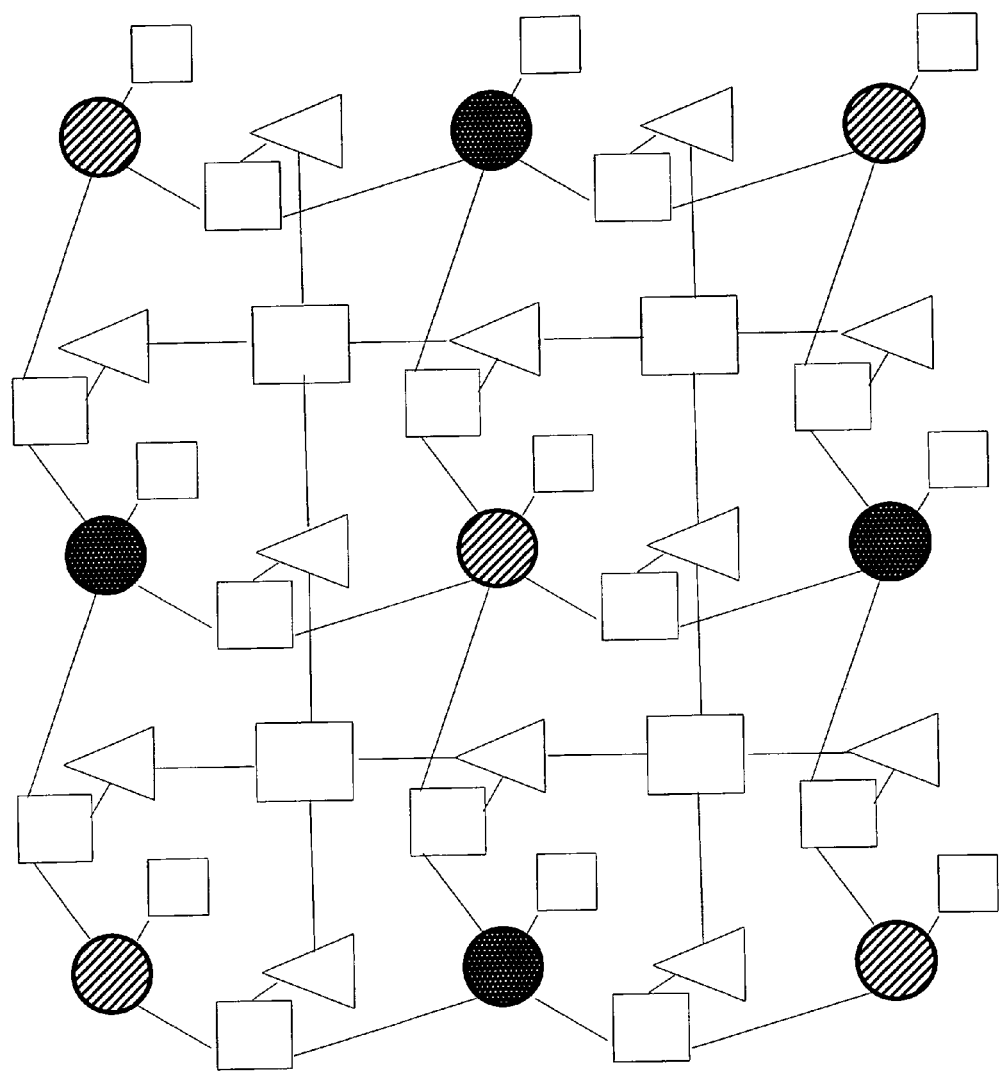
FIG. 9 is a checkerboard pattern associated with grouping and re-wrapped phases according to an embodiment of the invention.

Therefore, we partition the re-wrapped phases in two groups according to a "checkerboard" pattern as shown in FIG. 9, with alternating adjacent phase nodes being assigned to different groups. The upper-left-hand phase is always in the first group.

The ICM procedure 320 uses as input all of the integer-shifts and one of the two groups of phases. The procedure first optimizes the first group while holding the second group of the phases fixed. The second application of the ICM procedure reverses the roles of the first and second groups. The ICM procedure outputs optimized phase values for groups of phases. Because each re-wrapped phase is separately optimized while holding all neighboring phases fixed, each optimization is a local optimization.

We determine two quantities: an actual cost when a particular phase has a value that agrees with the evidence of the re-wrapped phase, that is, the phase in the interferogram; and an estimated cost obtained by ignoring the interferogram plus a penalty for ignoring the evidence.

To determine the estimated cost obtained by ignoring the interferogram, we determine, for each neighboring phase node, the phase value that the node should have according to our model. We call this the "advice" of the neighboring phase node. We use the median value of the advices as the best cost because of the linear dependence from the terrain cost of the difference between the selected phase and the advised phase. Typically, with four neighboring nodes, we actually obtain a range of equally good values, ranging from the second lowest advice to the second highest advice.

If the evidence is also within this range, then the best estimate for the phase is the one that agrees with the evidence. If the evidence is outside of this range, then we determine whether the lower cost is obtained by agreeing or disagreeing with the evidence. However, if the lower cost is obtained by disagreeing with the evidence, then we select the point in the range that is closest to the evidence as our phase value, otherwise we select the evidence itself.

Integrating the ICM and MCF Procedures

Each time the ICM or MCF procedures are applied, the procedures have the effect of reducing the overall cost as defined by the entire factor graph. The MCF procedure optimizes the integer shift node values, assuming that the phases are correct, while the ICM procedure optimize the value of half the phases assuming that the other half are correct along with the integer shift node values. Thus, we are guaranteed that iterating these procedures eventually yields a local minimum of the overall factor graph cost.

If the phase nodes at the beginning of iteration are substantially identical to the phase values at the beginning of the previous iteration, then we know that the procedure has converged. In practice, convergence usually occurs within ten iterations.

Our final output will be the converged values of the integer phase shifts and the re-wrapped phases, which are equivalent to the desired absolute unwrapped phases.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A computer implemented method for converting an input image of noisy wrapped phases to an output image of absolute unwrapped phases, comprising the steps of:
   representing noisy wrapped phases in an input image as a set of re-wrapped phases and a set of phase shifts;
   partitioning the set of re-wrapped phases into a first group and a second group;
   optimizing integer differences between the phase shifts, while holding the re-wrapped phases fixed;
   optimizing the first group of re-wrapped phases, while holding the integer differences between the phase shifts, and the second group of re-wrapped phases fixed;
   optimizing the integer differences between the phase shifts, while holding the re-wrapped phases fixed;
   optimizing the second group of re-wrapped phases, while holding the integer differences between the phase shifts, and the first group of re-wrapped phases fixed; and
   repeating the optimizing steps until the re-wrapped phases converge and outputting the converged re-wrapped phases and integer differences between the phase shifts as an output image of absolute unwrapped phases.

2. The method of claim 1, in which the partitioning assigns adjacent phases to different groups.

3. The method of claim 2, in which the partitioning is according to a checkerboard pattern.

4. The method of claim 1, in which the optimizing of the integer differences uses a minimum cost flow procedure, and the optimizing of the re-wrapped phases uses an iterated conditional modes procedure.

5. The method of claim 1, in which the wrapped phases are arranged on a two-dimensional rectangular lattice of an interferogram.

6. The method of claim 1, further comprising:
   providing a reliability map 203 indicating a reliability of each wrapped phases in the input image.

7. The method of claim 1, further comprising:
   constructing a factor graph from the set of re-wrapped phases and the set of phase shifts, in which the factor graph includes variable nodes, and in which the variable nodes include variable phase nodes and variable integer-shift nodes.

8. The method of claim 7, in which each phase node represent a non-integral part of the unwrapped phase, and each integer-shift node represents an integer phase difference between neighboring unwrapped phase nodes.

9. The method of claim 8, in which the integer phase difference is selected from a set $\{-1, 0, +1\}$.

10. The method of claim 7, in which the factor graph further comprises factor nodes, the factor nodes including evidence nodes, terrain nodes, and zero-curl nodes.

11. The method of claim 10, in which each factor node assign costs to a connected variable node.

12. The method of claim 10, in which each evidence node has a preferred value of a phase, and a cost for disagreeing with the preferred value.

13. The method of claim 10, in which each terrain node is connected to two adjacent variable phase nodes and one variable integer-shift node.

14. The method of claim 10, in which each zero curl node is connected to four adjacent variable integer-shift variable nodes.

15. The method of claim 14, in which the curl node enforces a constraint that as one travels around the four adjacent variable integer-shift nodes, one must return to the same unwrapped phase.

* * * * *